UNITED STATES PATENT OFFICE.

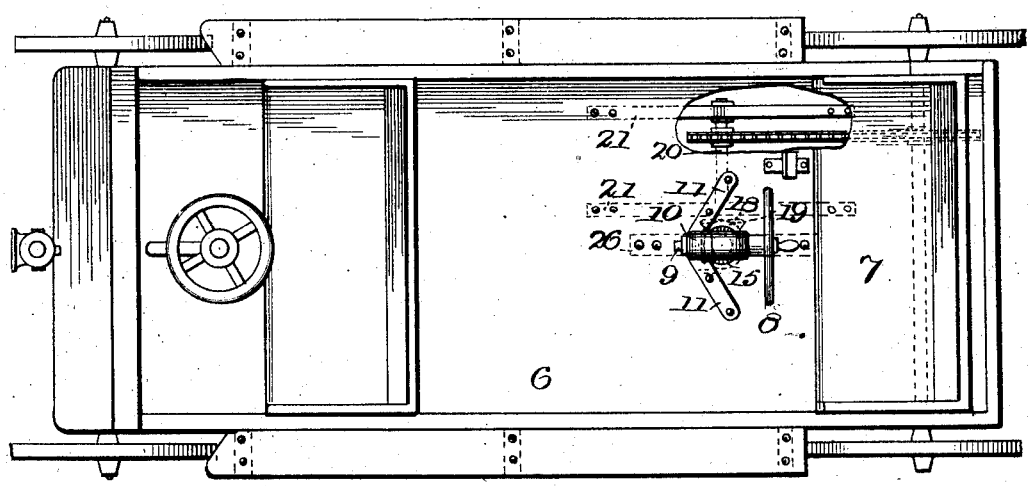

RUDOLPH J. WEBER, OF DETROIT, MICHIGAN.

VEHICLE.

No. 854,188.      Specification of Letters Patent.      Patented May 21, 1907.

Application filed August 25, 1906. Serial No. 331,996.

*To all whom it may concern:*

Be it known that I, RUDOLPH J. WEBER, a citizen of the United States, residing at Detroit, in the county of Wayne and State of Michigan, have invented new and useful Improvements in Vehicles, of which the following is a specification.

This invention is a mechanism adapted for the propulsion of a child's wagon or the like, and has for its object to provide an improved device of the kind.

The invention is illustrated in the accompanying drawings, in which

Figure 1 is a plan view of the wagon, part of the platform being broken away to show the gearing underneath. Fig. 2 is a sectional elevation showing the driving mechanism.

Referring specifically to the drawings, 6 indicates the platform of a wagon which may be of any desired or suitable construction, and having thereon a seat 7.

The driving mechanism comprises a hand-wheel 8 mounted upon a shaft 9 which extends lengthwise with respect to the wagon and in a horizontal position, the hand-wheel being mounted in convenient position to be turned by a child on the seat 7. The shaft is supported by an overhanging bracket 10 which has feet 11 extending at an angle to each other and bolted to the platform. The shaft 9 is carried in a bearing-box 12 on the upright part of the bracket and in a sleeve 13 at the lower end of the depending part thereof. Said shaft carries a bevel gear 14 which is in mesh with the bevel gear 15 on the upper end of a vertical shaft 16 which extends through the platform below the same. The vertical shaft 16 is supported by a casting 17 secured to the platform. At its lower end said shaft has a bevel gear 18 which meshes with a similar gear 19 on a horizontal cross shaft 20 which is supported by hangers 21 secured to the under side of the platform. Said shaft carries a sprocket-wheel 22 connected by a chain-belt 23 to a sprocket 24 on the rear axle 25. The lower end of the vertical shaft 16 is braced by a hanger 26 bolted to the under side of the platform.

By means of the gearing shown, motion applied to the hand-wheel 8 is communicated at a reduced speed to the rear axle, thereby driving the vehicle.

An advantageous feature of the mechanism is that it occupies very little space upon the platform and also permits the platform to be made solid or without openings except the hole through which the shaft 16 extends. The gooseneck or upper part of the supporting bracket 10 serves, in a measure, to cover the bevel gears 13 and 14 and to prevent injury to body or clothes by being caught in the gears. The vehicle may be supplied with any suitable brake and otherwise designed or fitted up as desired.

I claim:—

The combination of a closed platform provided with wheels, an arched bracket standing thereon, shaft hangers depending from the under side thereof, a horizontal shaft supported by said bracket under the arch thereof and provided with a hand-wheel, a vertical shaft extending through the platform under said arch and through one of said hangers and geared to the horizontal shaft, a lower horizontal cross shaft carried in another hanger and geared to the vertical shaft under the platform, and a chain and sprockets connecting said cross shaft and the axle of the vehicle.

In testimony whereof I have signed my name to this specification in the presence of two subscribing witnesses.

RUDOLPH J. WEBER.

Witnesses:
    CORA E. HEMPEL,
    WILLIAM COFFEY.